July 17, 1951
G. R. ONFREY
2,561,032
HYDRAULIC REVERSIBLE DISK PLOW
Filed Aug. 9, 1949
3 Sheets-Sheet 2
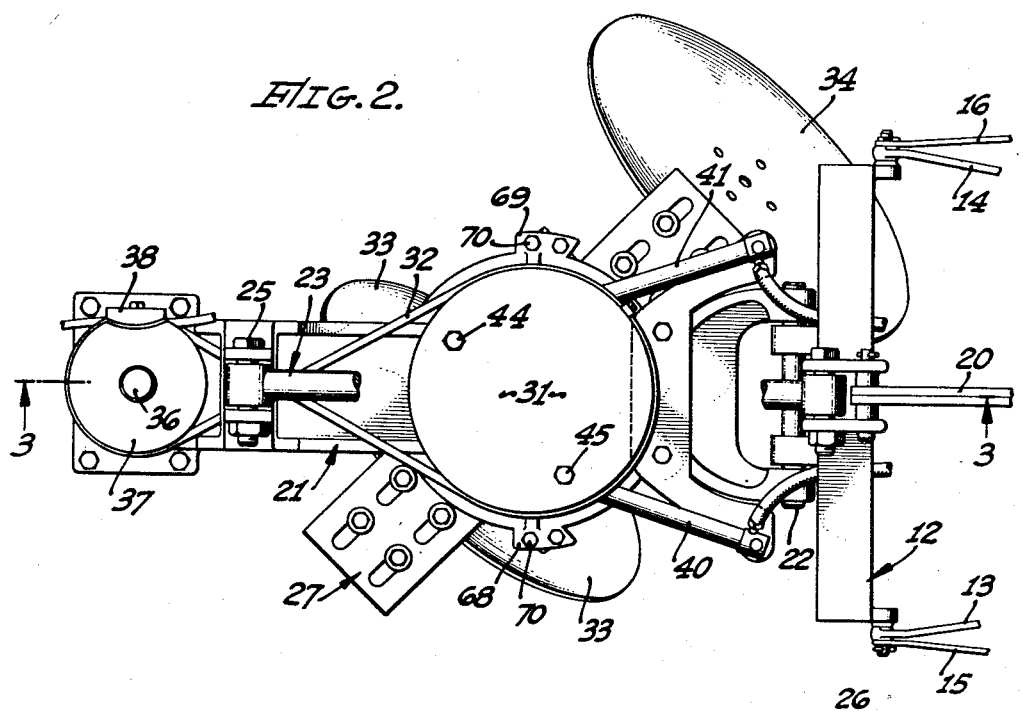
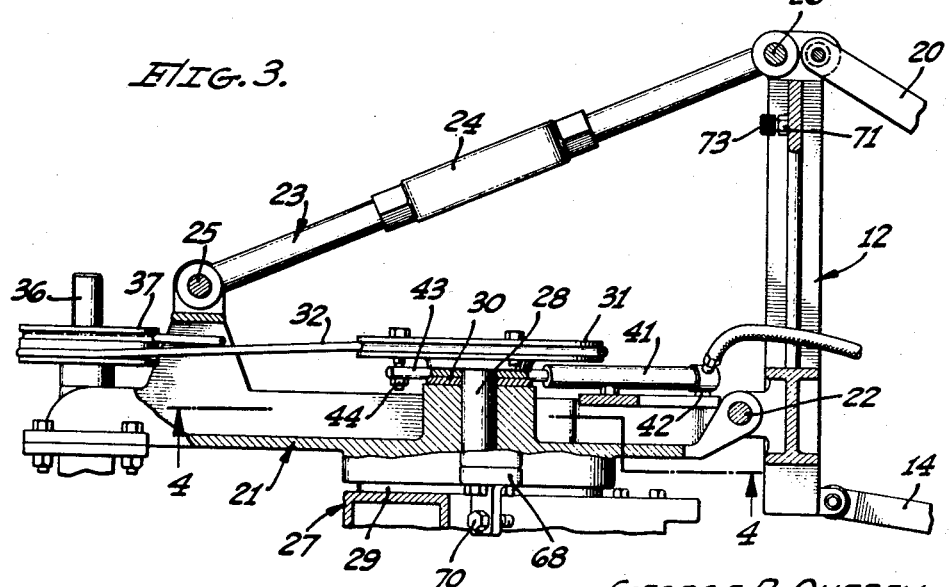
GEORGE R. ONFREY,
INVENTOR.
BY
Hazard & Miller
ATTORNEYS.

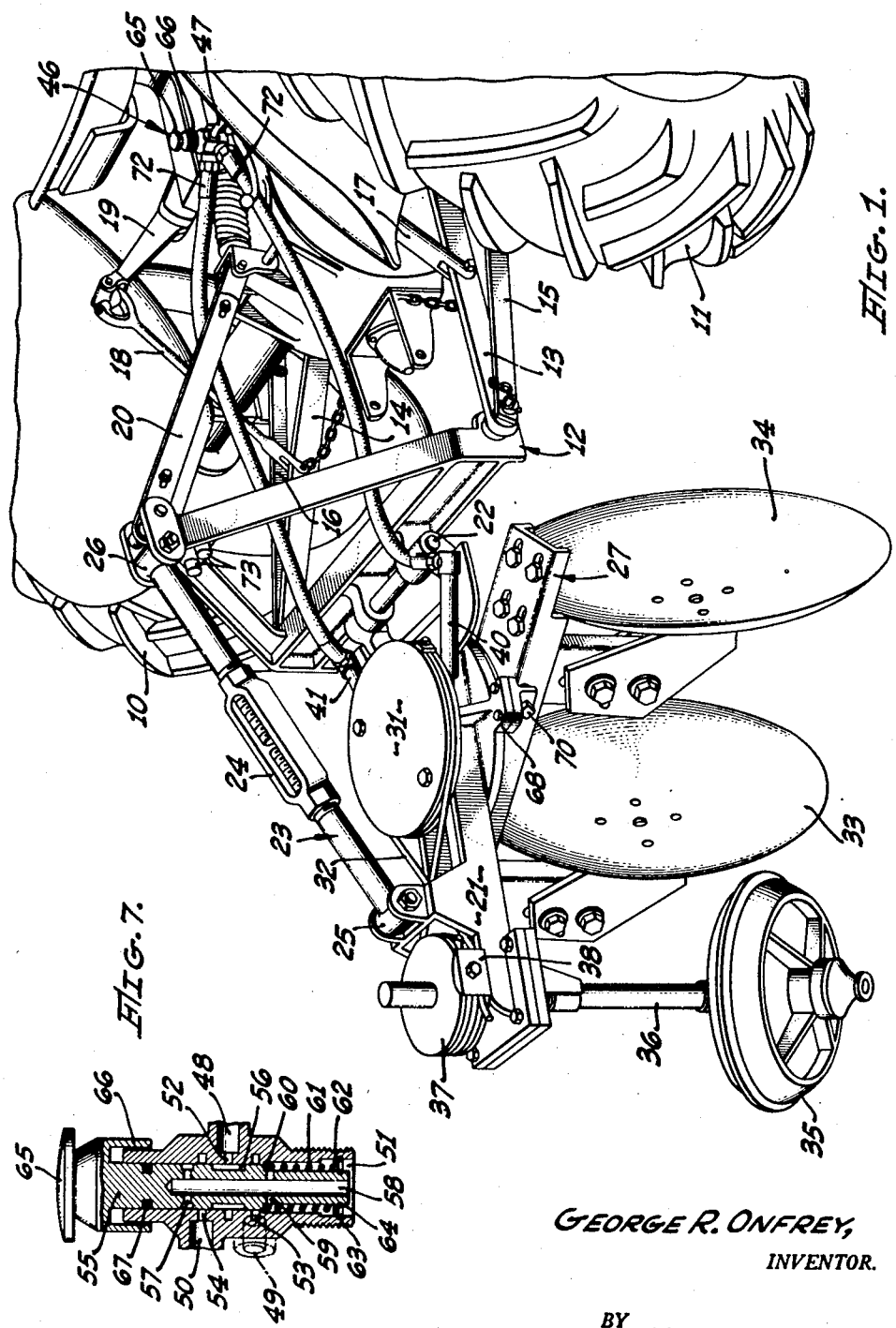

July 17, 1951 G. R. ONFREY 2,561,032
HYDRAULIC REVERSIBLE DISK PLOW
Filed Aug. 9, 1949 3 Sheets-Sheet 3

GEORGE R. ONFREY,
INVENTOR.

BY Hazard & Miller
ATTORNEYS.

Patented July 17, 1951

2,561,032

UNITED STATES PATENT OFFICE

2,561,032

HYDRAULIC REVERSIBLE DISK PLOW

George R. Onfrey, Bakersfield, Calif., assignor to Phillips Foundry Company, Bakersfield, Calif., a corporation of California Application August 9, 1949, Serial No. 109,369

9 Claims. (Cl. 97—32)

This invention relates to improvements in reversible disc plows for tractors and may be considered as an improvement over the construction disclosed in application Serial No. 43,920, filed August 12, 1948, by George R. Onfrey.

In the above entitled application there is disclosed a reversible disc plow for tractors consisting essentially of a plow frame attachable to the A frame of a tractor so as to extend rearwardly therefrom. The A frame of the tractor is adapted to be hydraulically raised and lowered by a hydraulic system on the tractor. A plow beam is mounted for oscillatory movement on the plow frame and has mounted thereon one or more disc plows. A mechanical mechanism is employed for oscillating or swinging the plow beam from one to the other of two extreme positions. In one of these positions the plows are so arranged as to turn the furrow to the left and in the other extreme position the plows are arranged to turn the furrow to the right. Consequently, in traversing a field to be plowed at the end of each traverse the A frame may be hydraulically lifted by the hydraulic system on the tractor and in so doing the plow frame will be automatically and positively swung from one extreme position to another so as to reverse the plows in making a reverse traverse across the field. A furrow wheel is arranged on the plow frame for oscillatory movement and is operatively connected to the plow beam so that whenever the plow beam is swung from one extreme position to the other the furrow wheel will also be automatically and simultaneously reversed.

An object of the present invention is to provide a plow attachable to a tractor having a hydraulically operated or elevated A frame and which has a plow beam adapted to be swung from one extreme position to the other to effect a reversal of the plows, the improvement residing primarily in providing a hydraulic mechanism operable from the hydraulic system of the tractor for effecting a swinging of the plow beam from one extreme position to the other. In this manner the hydraulic system of the tractor can be utilized not only to raise and lower the A frame but will serve to also positively swing the plow frame from one position to the other in reversing the plows. The fluid used to effect a reversal being a liquid and relatively incompressible will serve also as a means for hydraulically locking the plow beam in either of its extreme positions.

The improved construction also contemplates the use of a reversible furrow wheel which is operatively connected to the plow beam so as to be automatically and simultaneously reversed when the position of the plow beam is reversed.

Another object of the invention is to provide an improved construction having the abovementioned characteristics which will employ a simple but highly efficient four-way valve which can be conveniently located with relation to the driver's seat of the tractor and which will serve to properly direct the fluid under pressure from the pressure source on the tractor to the plow beam actuators and which will permit of the return of fluid from the actuators to the transmission case of the tractor, the valve being so designed that when released it will automatically return to a neutral or central position effectively locking the fluid in the plow beam actuators so as to hydraulically lock the plow beam in its extreme positions.

With the foregoing and other objects in view, which will be made manifest in the following detailed description and specifically pointed out in the appended claims, reference is had to the accompanying drawings for an illustrative embodiment of the invention, wherein:

Figure 1 is a partial view in perspective illustrating the rear portion of a conventional tractor having an A frame adapted to be hydraulically raised and lowered and illustrating the plow embodying the present invention as having been applied thereto;

Fig. 2 is a top plan view of the plow shown in Fig. 1, the plow beam being illustrated, however, as having been swung into the opposite extreme position from that shown in Fig. 1;

Fig. 3 is a longitudinal vertical section taken substantially upon the line 3—3 upon Fig. 2;

Fig. 7 is a vertical section through the four-way valve.

Figure 4:
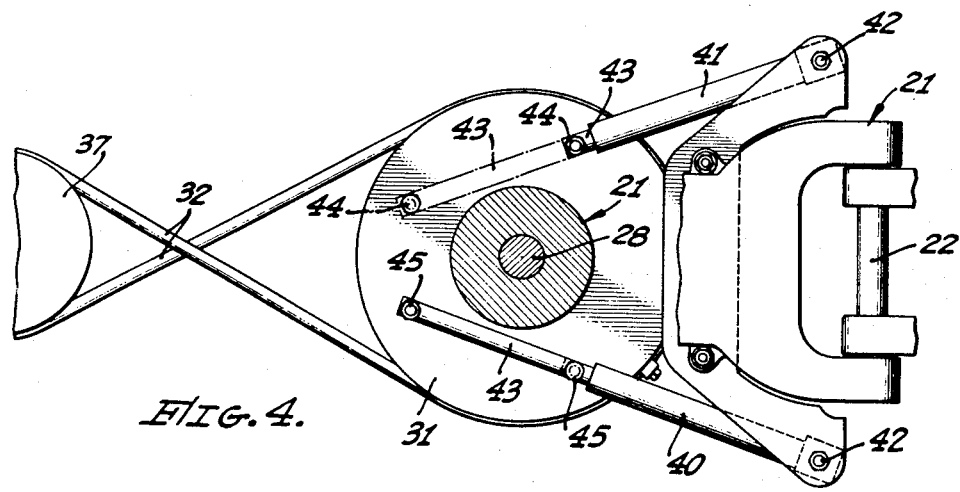
Fig. 4 is a horizontal section taken substantially upon the line 4—4 upon Fig. 3 in the direction indicated.
Figure 5:
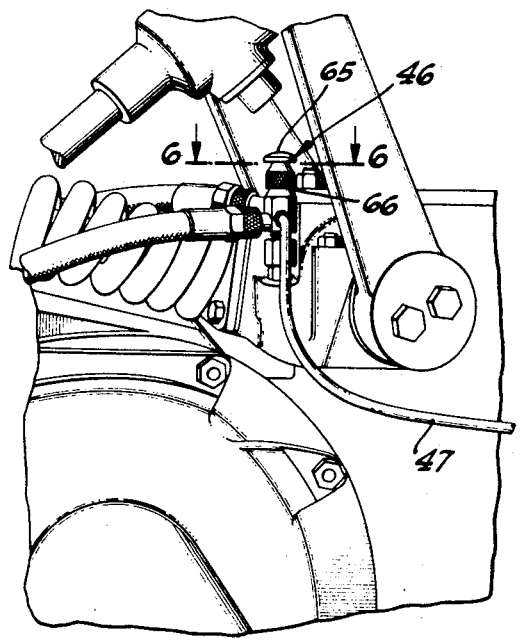
Fig. 5 is a partial view in elevation illustrating the location of the four-way valve which is employed as a part of the improved plow.
Figure 6:
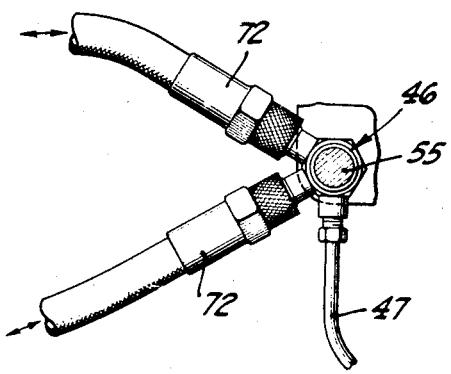
Fig. 6 is a horizontal section taken substantially upon the line 6—6 upon Fig. 5.

Referring to the accompanying drawings wherein similar reference characters designate similar parts throughout, the rear portion of a conventional type of tractor has been illustrated wherein the drive wheels or rear wheels have been indicated generally at 10 and 11. Between these wheels and somewhat to the rear thereof there is supported an A frame 12 to which bars 13 and 14 are connected and stabilizers 15 and 16 are also connected. The bars 13 and 14 are adapted to be raised and lowered by means of links 17 and 18 which are connected to crank arms 19. The crank arms 19 are hydraulically actuated, the construction of the tractor including a hydraulic pump which supplies fluid under pressure to a hydraulic ram to which the arms 19 are connected. A suitable control (not shown) enables the operator of the tractor to optionally actuate the crank arms 19 and thus effect a raising or lowering of the A frame 12 as desired. The top of the A frame has a link 20 pivotally connecting it with the body of the tractor to maintain the A frame in an upright position in all positions.

The above described construction is conventional on certain types of tractors now on the market and the plow embodying the present invention is designed to be applicable to tractors of this type. The plow consists of a plow frame 21 which is pivotally connected as at 22 to the A frame and extends rearwardly therefrom. A link 23 which includes a turnbuckle 24 is pivotally connected as at 25 to the plow frame and at 26 to the top of the A frame. The turnbuckle 24 provides for adjustment by which the plow frame can be swung about 22 to effect an adjustment of the plow frame with relation to the A frame. A plow beam 27 is pivotally mounted intermediate its ends on the plow frame. In the preferred form of construction a vertical shaft 28 is rigidly secured to the plow beam and extends upwardly through the plow frame and through washers or bearing plates 29 and 30. This shaft carries a circular disc 31 at its top the disc being grooved at its edge to accommodate a cable 32. The plow beam may assume either of two extreme positions, one of which, as illustrated in Fig. 1, is such that the disc plows 33 and 34 mounted on the plow beam will turn furrows to the right. The other extreme position is as illustrated in Fig. 2 wherein the plows 33 and 34 are so arranged as to turn the furrow to the left.

At the rear of the plow frame there is a furrow wheel 35 which is mounted on a vertical shaft 36 that extends upwardly through the plow frame and which carries a disc 37. The ends of the cable 32 are crossed between the disc 31 and the disc 37 and after being wrapped or trained around the disc 37 the cable ends are locked thereon such as by a cable lock 38. By means of this construction, when the plow beam 27 is swung from the position shown in Fig. 1 to the position shown in Fig. 2, the furrow wheel 35 will be simultaneously and automatically turned from the position shown in Fig. 1 to a reverse position on the other side of the axis of the shaft 36 so as to perform its function in accordance with the changed condition or positions of the plows 33 and 34.

As a means for actuating the plow beam and shifting it from one extreme position to the other, hydraulic rams are employed the cylinders of which are indicated at 40 and 41. These cylinders are pivotally mounted as at 42 on the forward end of the plow frame. Within the cylinders there are pistons having rods 43 which are pivotally mounted as at 44 and 45 on the underside of the disc 31. Hydraulic hoses connect the cylinders 40 and 41 to two outlets of a four-way valve, generally indicated at 46, which is mounted on the body of the tractor so that its lower end will communicate with the interior of the transmission case of the tractor. A tubing 47 is connected to the hydraulic pump of the hydraulic system of the tractor so as to receive hydraulic fluid under pressure therefrom and deliver it to the four-way valve. The four-way valve serves to direct fluid thus received under pressure through the tubing 47 to either of the cylinders 40 or 41. Simultaneously the four-way valve serves to release or drain the other of the cylinders so that the fluid contained therein may be returned through the four-way valve to the transmission case and eventually utilized again in the hydraulic system in the tractor. Thus, if the four-way valve is manipulated to supply fluid under pressure to the cylinder 40 and thus effect a return of the plow beam from the position shown in Fig. 2 to the position shown in Fig. 1, cylinder 41 is simultaneously opened by the four-way valve so that the fluid therein contained may be returned through its hose to the four-way valve 46 and thence to the transmission case. A converse operation will take place if the four-way valve is oppositely manipulated. The details of construction of the four-way valve are illustrated in Fig. 7 wherein the inlet to which the tubing 47 is connected is illustrated at 48. The outlet leading to the cylinder 40 is indicated at 49 and the outlet to the cylinder 41 is indicated at 50. The outlet for returning fluid to the transmission case is indicated at 51. The inlet 48 communicates with an annular internal groove formed on the interior of the valve housing as indicated at 52 and in a similar manner the outlets 49 and 50 communicate with annular grooves 53 and 54. A plunger 55 is vertically reciprocable in the valve housing and has an annular groove 56 thereon which is of such a width to be constantly in communication with the groove 52. Near the top of the plunger there is a diametrical bore 57 which communicates with a vertical central bore 58 in the plunger. In a similar manner there is a lower diametrical bore 59 formed in the plunger. The plunger and valve housing form alignable shoulders against which a ring 60 is adapted to be positioned which provides a seat for a compression spring 61. The lower end of this compression spring is disposed against a ring 62 adapted to rest against either or both of two snap rings 63 and 64 that are partially received on the plunger and on the interior of the valve housing, respectively. The plunger is adapted to be manually shifted or actuated by a button 65 carrying a skirt 66. Leakage is prevented between the plunger and the valve housing such as by the packing ring 67.

In the position shown in Fig. 7, the plunger closes the inlet 48 against egress through either of the outlets 49, 50 or 51. However, if the plunger is lifted from the position shown, groove 56 will establish communication between inlet 48 and outlet 50. At the same time it will establish communication between the groove 53 and the bore 59. Consequently, in such position, fluid under pressure will be supplied to the cylinder 41 and fluid in the cylinder 42 may return through 49, 59, 58 and 51 and be returned to the transmission case. Upward lifting of the plunger will cause the snap ring 64 to lift the ring 62 compressing the compression spring 61. However, whenever the plunger is released the compression spring 61 is immediately effective to return the plunger to the neutral position shown in Fig. 7.

Conversely, if the plunger is depressed from the position shown in Fig. 7, groove 56 will establish communication between the inlet 48 and the outlet 49. In this position the diametric aperture 57 is disposed so as to receive returning fluid through 50 from the cylinder 41 and return it through the bore 58 to the transmission case. When the plunger is released the compression spring is effective to return the plunger to the position shown in Fig. 7, the upward movement of the plunger under the influence of the compression spring being limited by the washer 60 engaging the shoulder on the interior of the valve housing.

From the above described construction it will be appreciated that an improved reversible plow has been provided which utilizes as the means for effecting a reversal the source of fluid pressure that is a part of the mechanism of the tractor and which is utilized to effect a raising and lowering of the A frame. When the A frame is in elevated position the plow beam can be swung from one to the other of its extreme positions by either lifting or depressing the plunger of the four-way valve. When the plunger is released it automatically returns to its neutral position and in the neutral position the fluid in the cylinders of the hydraulic rams is effectively locked therein so that as a result the plow beam is locked hydraulically in either of its extreme positions. It is, of course, possible to release the plunger of the four-way valve before the plow beam has reached an extreme position and thus lock the plow beam in any of its intermediate positions. The extreme positions of the plow beam are governed by means of adjustable stops 68 and 69 on the sides of the plow frame which carry adjustable screws 70 that are engageable by the sides of the plow beam. Adjustment of the turnbuckle 24 is effective to vary the inclination of the plow frame with relation to the A frame and in this manner effect a variation of the depth of the plow.

While the number of plows employed on the plow beam may vary, two is preferable and these are preferably so arranged as to be on opposite sides of the center of rotation of the plow beam.

There are occasions when it is desired to detach the plow beam and A frame from the tractor and to this end the top of the A frame is provided with short nipples 71. These nipples are designed to be complementary to the hose couplings 72 on the hoses and normally have caps 73 applied thereto. When the hoses are disconnected from the four-way valve 46 the hose couplings 72 can be screwed off of the nipples 71 and the caps 73 can be screwed onto the outlets from the four-way valve. In this manner both the hoses and the four-way valve can be protected from contamination when the plow is not in use on the tractor.

Various changes may be made in the details of construction without departing from the spirit and scope of the invention as defined by the appended claims.

I claim:

1. In combination with a tractor having an A frame and hydraulically operable means for effecting a raising and lowering of the A frame, a plow frame secured to the A frame and extending rearwardly therefrom, a plow beam swingably mounted upon the plow frame, one or more disc plows mounted upon the plow beam and adapted when the plow beam is swung to either of its extreme positions to turn furrows to the right or to the left, hydraulic rams connecting the plow frame and the plow beam adapted when actuated to swing the plow beam, a fluid pressure take-off from the source of hydraulic power of the tractor, and a four-way valve controlling the supply of fluid pressure to either of the rams and serving to drain the other of the rams to the transmission case of the tractor.

2. In combination with a tractor having a power elevatable A frame, a plow beam having one or more disc plows thereon, supporting means for mounting the beam for swinging movement with respect to the A frame so as to be capable of being raised and lowered thereby and swinging relatively thereto, hydraulic rams connecting the plow beam to the supporting means and by which the plow beam may be swung to cause plows thereon to turn furrows optionally to the right or to the left, means for supplying the hydraulic rams with fluid under pressure, and valve means for controlling the fluid supplied to the rams whereby when one ram is supplied with pressure the other ram will be opened to release its fluid for return to the source of supply of fluid pressure.

3. In combination with a tractor having a power elevatable A frame, a plow beam having one or more disc plows thereon, supporting means for mounting the beam for swinging movement with respect to the A frame so as to be capable of being raised and lowered thereby and swinging relatively thereto, hydraulic rams connecting the plow beam to the supporting means and by which the plow beam may be swung to cause plows thereon to turn furrows optionally to the right or to the left, means for supplying the hydraulic rams with fluid under pressure, and a single valve controlling the fluid supplied to the rams adapted to assume either a neutral position wherein fluid is neither supplied nor released from the rams or either of two extreme positions wherein fluid under pressure is supplied to one ram and released from the other for return to the source of supply.

4. A plow attachable to tractors having hydraulically elevatable A frames comprising a plow frame, means for pivotally attaching the plow frame to the A frame, adjustable means for connecting the rear end of the plow frame to the top of the A frame, a plow beam mounted for oscillatory movement on the plow frame about a vertical axis, one or more plows mounted on the plow beam, hydraulic rams connecting the plow frame to the plow beam and by which the plow beam may be swung into either of two extreme positions, stops on the plow frame engageable by the plow beam, hoses leading to the hydraulic rams, a four-way valve to which the hoses are connected, means for supplying the four-way valve with fluid under pressure, and means for returning fluid from the hydraulic rams through the four-way valve to the source of supply.

5. A plow attachable to tractors having hydraulically elevatable A frames comprising a plow frame, means for pivotally attaching the plow frame to the A frame, adjustable means for connecting the rear end of the plow frame to the top of the A frame, a plow beam mounted for oscillatory movement on the A frame about a vertical axis, one or more plows mounted on the plow beam, hydraulic rams connecting the plow frame to the plow beam and by which the plow beam may be swung into either of two extreme positions, stops on the plow frame engageable by the plow beam, hoses leading to the hydraulic rams, a four-way valve to which the hoses are connected, means for supplying the four-way valve with fluid under pressure, means for returning fluid from the hydraulic rams through the four-way valve to the source of supply, a furrow wheel mounted for rotation about a vertical axis on the rear of the plow frame, and means connecting the furrow wheel to the plow beam whereby the position of the furrow wheel will be reversed upon reversal of position of the plow beam.

6. A reversible plow comprising a plow frame adapted to be attached to the A frame of a tractor, a plow beam rotatably mounted on the plow frame for oscillatory movement about a vertical axis, a disc rigid with the plow beam, hydraulic rams pivotally connecting the disc and the plow frame and by which the disc and plow beam can be swung relatively to the plow frame, stops on the plow frame limiting the swinging movement of the plow beam, means for optionally supplying either ram with fluid under pressure and draining fluid from the other ram, a furrow wheel rotatably mounted on the plow beam for rotation about a vertical axis, and means connecting the furrow wheel to the disc whereby on swinging the plow beam and disc from one extreme position to the other the position of the furrow wheel will be reversed.

7. A plow attachable to tractors having hydraulically elevatable A frames comprising a plow frame attachable to an A frame, a plow beam mounted for oscillatory movement on the plow frame about a vertical axis, one or more plows mounted on the plow beam, hydraulic rams connecting the plow frame to the plow beam and by which the plow beam may be swung into either of two extreme positions, stops on the plow frame engageable by the plow beam, hoses leading to the hydraulic rams, a four-way valve to which the hoses are connected, means for supplying the four-way valve with fluid under pressure, and means for returning fluid from the hydraulic rams through the four-way valve to a source of supply.

8. A plow attachable to tractors having hydraulically elevatable A frames comprising a plow frame attachable to an A frame, a plow beam mounted for oscillatory movement on the plow frame about a vertical axis, one or more plows mounted on the plow beam, hydraulic rams connecting the plow frame to the plow beam and by which the plow beam may be swung into either of two extreme positions, stops on the plow frame engageable by the plow beam, a four-way valve connected to the rams for supplying fluid under pressure to the rams and receiving fluid from the rams, and means for supplying the four-way valve with fluid under pressure and for conducting fluid away from the valve.

9. A plow attachable to tractors having hydraulically elevatable A frames comprising a plow frame attachable to an A frame, a plow beam mounted for oscillatory movement on the plow frame about a vertical axis, one or more plows mounted on the plow beam, hydraulic rams connecting the plow frame to the plow beam and by which the plow beam may be swung into either of two extreme positions, stops on the plow frame engageable by the plow beam, a single hose leading to each ram, a four-way valve connected to the hoses for supplying fluid under pressure to the rams through the hoses and receiving fluid from the rams through the hoses, and means for supplying the four-way valve with fluid under pressure and for conducting fluid under pressure away from the valve.

GEORGE R. ONFREY.

REFERENCES CITED

The following references are of record in the file of this patent:

UNITED STATES PATENTS

| Number | Name | Date |
| --- | --- | --- |
| 2,041,216 | Sjogren | May 19, 1936 |
| 2,269,502 | Wilson | Jan. 13, 1942 |
| 2,320,624 | Love | June 1, 1943 |
| 2,322,342 | Bunn | June 22, 1943 |
| 2,336,848 | Cruse | Dec. 14, 1943 |
| 2,453,197 | Clay | Nov. 9, 1948 |
| 2,456,693 | Fraga | Dec. 21, 1948 |